United States Patent
Park et al.

(10) Patent No.: US 11,812,118 B2
(45) Date of Patent: Nov. 7, 2023

(54) CLIENT FORENSIC WATERMARKING DEVICE, SYSTEM, AND METHOD

(71) Applicant: INKA ENTWORKS, INC, Seoul (KR)

(72) Inventors: Byeong Sun Park, Suwon-si (KR); Sang Ho Park, Gwangju-si (KR); Sung Ju Yun, Goyang-si (KR)

(73) Assignee: INKA ENTWORKS, INC, Seoul (KR)

( * ) Notice: Subject to any disclaimer, the term of this patent is extended or adjusted under 35 U.S.C. 154(b) by 113 days.

(21) Appl. No.: 17/614,944

(22) PCT Filed: Nov. 12, 2020

(86) PCT No.: PCT/KR2020/015908
§ 371 (c)(1),
(2) Date: Nov. 29, 2021

(87) PCT Pub. No.: WO2021/101170
PCT Pub. Date: May 27, 2021

(65) Prior Publication Data

US 2022/0239993 A1       Jul. 28, 2022

(30) Foreign Application Priority Data

Nov. 22, 2019   (KR) ........................ 10-2019-0151243

(51) Int. Cl.
*H04N 21/8358*   (2011.01)
*H04N 21/43*   (2011.01)
(Continued)

(52) U.S. Cl.
CPC ....... *H04N 21/8358* (2013.01); *G06T 1/0085* (2013.01); *H04N 21/437* (2013.01);
(Continued)

(58) Field of Classification Search
CPC ......... H04N 21/8358; H04N 21/43074; H04N 21/4312; H04N 21/437; H04N 21/654; G06T 1/0085
See application file for complete search history.

(56) References Cited

U.S. PATENT DOCUMENTS

| | | | | |
|---|---|---|---|---|
| 6,430,301 | B1 * | 8/2002 | Petrovic | .................. H04L 63/12 |
| | | | | 713/176 |
| 7,644,282 | B2 * | 1/2010 | Petrovic | ............. H04N 21/8113 |
| | | | | 713/176 |

(Continued)

FOREIGN PATENT DOCUMENTS

| CN | 110287658 A | * | 9/2019 |
|---|---|---|---|
| KR | 10-2011-0007789 A | | 1/2011 |

(Continued)

OTHER PUBLICATIONS

Feb. 22, 2021 International Search Report issued in Patent Application No. PCT/KR2020/015908.

*Primary Examiner* — James R Sheleheda
(74) *Attorney, Agent, or Firm* — Oliff PLC (57) ABSTRACT

A client forensic watermarking device, system, and method. A forensic watermarking device capable of communicating with a content server selecting a watermark mask area in which a watermark mask is displayed from video content and storing watermark area information about the watermark mask area in a storage unit according to the present disclosure may provide: a downloading unit requesting the video content to be played from the content server and receiving the video content and the watermark area information from the content server; a watermark mask generation unit outputting the watermark mask using the watermark area information inputted from the downloading unit; and an overlay unit superimposing the watermark mask inputted from the watermark mask generation unit on the watermark mask (Continued)

area of the video content inputted from the downloading unit, thereby enabling a client to display a forensic watermark so as to deal with a collusion attack.

9 Claims, 4 Drawing Sheets

(51) Int. Cl.
    *H04N 21/431*       (2011.01)
    *H04N 21/654*       (2011.01)
    *G06T 1/00*          (2006.01)
    *H04N 21/437*       (2011.01)

(52) U.S. Cl.
    CPC ... *H04N 21/4312* (2013.01); *H04N 21/43074* (2020.08); *H04N 21/654* (2013.01)

(56) References Cited

U.S. PATENT DOCUMENTS

| | | | |
|---|---|---|---|
| 8,020,004 B2* | 9/2011 | Winograd | G06F 21/16 |
| | | | 713/176 |
| 8,165,343 B1* | 4/2012 | McGowan | H04N 21/8358 |
| | | | 348/461 |
| 8,189,859 B2 | 5/2012 | Kim et al. | |
| 8,259,938 B2* | 9/2012 | Petrovic | G10L 19/018 |
| | | | 704/200 |
| 9,742,783 B2 | 8/2017 | Kim et al. | |
| 2003/0112974 A1* | 6/2003 | Levy | H04N 21/4622 |
| | | | 713/176 |
| 2005/0039020 A1* | 2/2005 | Levy | H04N 21/8358 |
| | | | 713/176 |
| 2008/0215605 A1* | 9/2008 | Van Leest | H04N 21/8358 |
| | | | 375/E7.184 |
| 2014/0098985 A1* | 4/2014 | Brubeck | G06T 1/0028 |
| | | | 382/100 |
| 2014/0270338 A1* | 9/2014 | Zhao | G06T 1/0028 |
| | | | 382/100 |
| 2014/0325550 A1* | 10/2014 | Winograd | H04N 21/8456 |
| | | | 725/19 |
| 2018/0285537 A1* | 10/2018 | Wachtfogel | H04N 5/913 |
| 2018/0295172 A1* | 10/2018 | Vikramaratne | H04L 65/70 |

FOREIGN PATENT DOCUMENTS

| | | |
|---|---|---|
| WO | 2012/082526 A2 | 6/2012 |
| WO | 2017/081177 A1 | 5/2017 |

* cited by examiner

CLIENT FORENSIC WATERMARKING DEVICE, SYSTEM, AND METHOD

BACKGROUND OF THE INVENTION

1. Field of the Invention

The present disclosure relates to a client forensic watermarking device, system, and method and, more particularly, to a client forensic watermarking device, system, and method enabling a client to display a forensic watermark using a watermark mask.

2. Description of the Prior Art

A method of embedding a forensic watermark in a server requires a large number of server resources and has a low real-time responsiveness. Therefore, for a server to embed a forensic watermark, it is necessary to overcome a difficulty of embedding user information in real time. To overcome the difficulty, a method is employed in which a 0 content file in which watermark 0 is embedded in video content and a 1 content file in which watermark 1 is embedded in the video content are generated through a preprocessing procedure and then a forensic watermark is embedded by combining the 0 content file and the 1 content file, generated in the preprocessing procedure, in real time based on user information. However, this method has a fatal weakness that the forensic watermark can be easily paralyzed by a plurality users combining respectively sections of content in their possession. For example, two users can download content sections respectively and mix them to make a completely different content file, thereby paralyzing information embedded by a service provider.

Further, when hardware digital rights management (DRM) is applied to video content, it is impossible to embed a watermark by fabricating an image. Therefore, there is a need for a method for displaying a forensic watermark that can also be embedded in video content to which hardware DRM is applied.

SUMMARY OF THE INVENTION

To solve the foregoing problems, an aspect of the present disclosure is to provide a client forensic watermarking device, system, and method enabling a client to display a forensic watermark using a watermark mask.

In view of the foregoing aspect, a forensic watermarking device capable of communicating with a content server selecting a watermark mask area in which a watermark mask is displayed from video content and storing watermark area information about the watermark mask area in a storage unit according to an embodiment of the present disclosure may include: a downloading unit requesting the video content to be played from the content server and receiving the video content and the watermark area information from the content server; a watermark mask generation unit outputting the watermark mask using the watermark area information inputted from the downloading unit; and an overlay unit superimposing the watermark mask inputted from the watermark mask generation unit on the watermark mask area of the video content inputted from the downloading unit.

The downloading unit may further receive a client session ID from the content server, and the watermark mask generation unit may generate and output the watermark mask using the client session ID inputted from the downloading unit.

The watermark mask generation unit may generate a mask frame including the watermark mask, and the overlay unit may superimpose the mask frame inputted from the watermark mask generation unit on an image frame including the watermark mask area, of the video content inputted from the downloading unit.

The mask frame may be divided into a background and a foreground, and different alpha values representing a transparency level may be imparted to the background and the foreground for invisibility.

The watermark mask generation unit may extract a luminance value from the watermark area information, and may select a darkness alpha value for the background when the luminance value is a darkness value based on a predetermined threshold value.

The forensic watermarking device may further include a synchronization management unit synchronizing the mask frame with the image frame so that the mask frame is superimposed on the image frame including the watermark mask area, of the video content.

When overlay duration indicating that there is no change in an image frame following the image frame including the watermark mask area is received, the synchronization management unit may synchronize the mask frame with the image frame so that the mask frame is superimposed on the image frame for the overlay duration.

The forensic watermarking device may further include an attack-defense unit monitoring, with respect to the watermark mask, whether the client session ID received from the content server is valid, whether the synchronization management unit operates based on the overlay duration, or whether an operation of the overlay unit is removed and only the video content is displayed.

A forensic watermarking system according to another embodiment of the present disclosure may include: a content server selecting a watermark mask area in which a watermark mask is displayed from video content and storing watermark area information about the watermark mask area; and the foregoing forensic watermarking device, wherein, when client metadata is received along with a request for the video content to be played from the downloading unit, the content server may generate the client session ID for specifying a client of the video content and may store the client session ID along with the client metadata in the storage unit, thereby achieving the foregoing aspect.

The content server may analyze blocks of a predetermined frame of GOP content of the video content and may store location information about blocks in which the watermark mask is displayed as the watermark area information.

A forensic watermarking method performed by a forensic watermarking device capable of communicating with a content server selecting a watermark mask area in which a watermark mask is displayed from video content and storing watermark area information about the watermark mask area in a storage unit according to another embodiment of the present disclosure may include: a step of requesting the video content to be played from the content server and receiving the video content and the watermark area information from the content server; a step of outputting the watermark mask using the watermark area information received in the receiving step; and a step of superimposing the watermark mask outputted in the outputting step on the watermark mask area of the video content received in the receiving step, thereby achieving the foregoing aspect.

According to the present disclosure, with the foregoing configuration, a client may display a forensic watermark, thereby dealing with a collusion attack.

Further, according to the present disclosure, it is possible to display a forensic watermark even when hardware digital rights management (DRM) is applied to video content.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Hereinafter, exemplary embodiments of a client forensic watermarking device, system, and method according to the present disclosure are described with reference to the accompanying drawings. For reference, in describing the present disclosure below, terms referring to components of the present disclosure are named in consideration of the functions of the respective components and thus should not be construed as limiting the technical components of the present disclosure.

Figure 1:
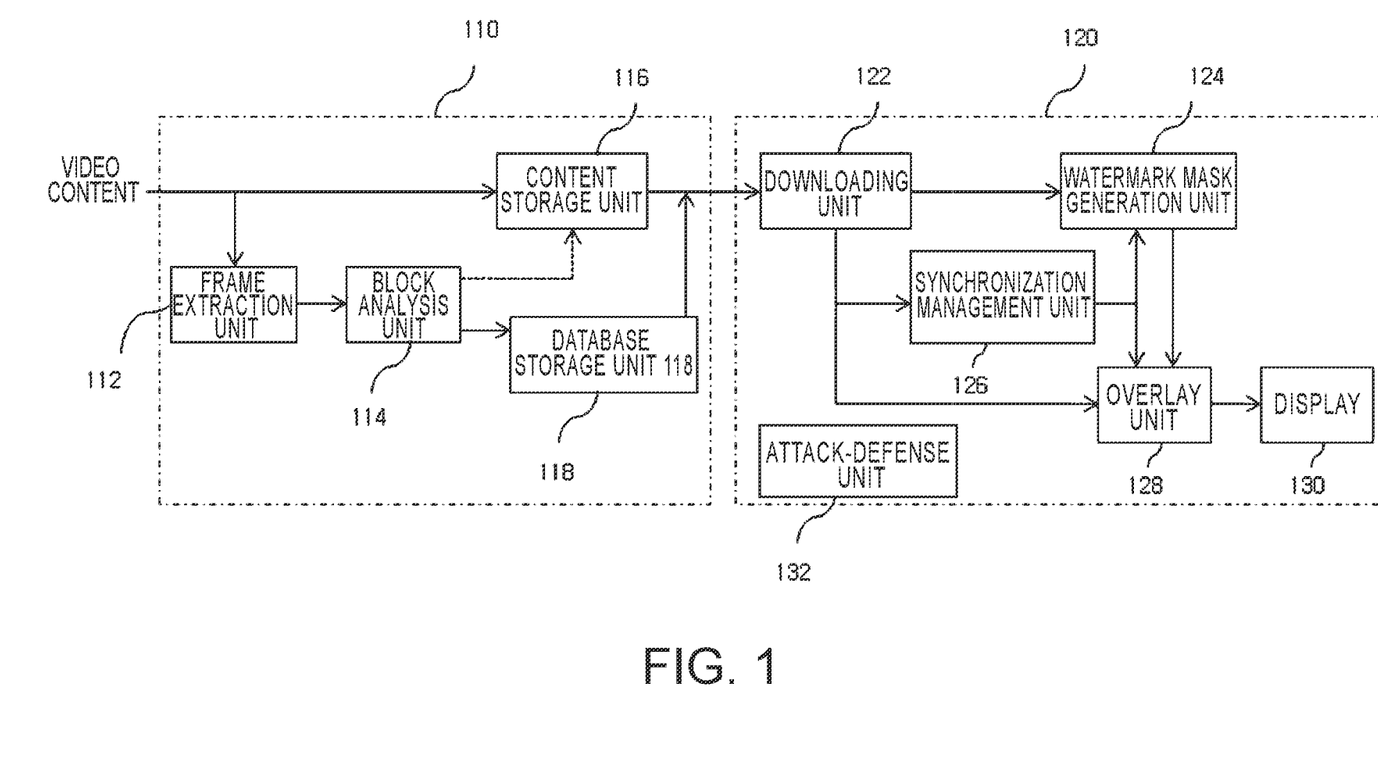
FIG. 1 is a block diagram illustrating a forensic watermarking device according to an embodiment of the present disclosure.
Figure 2:
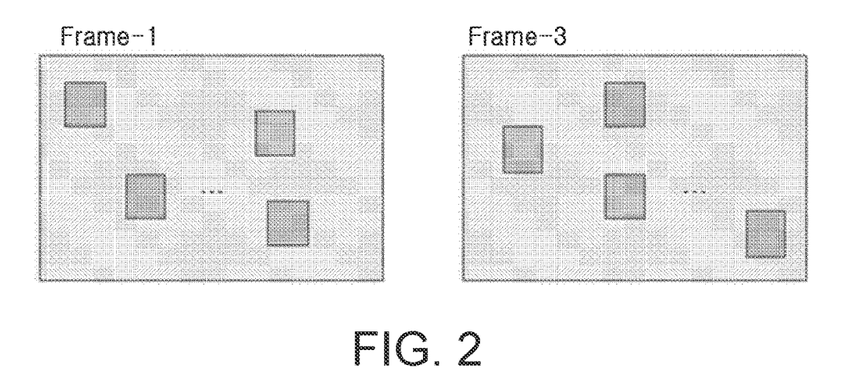
FIG. 2 illustrates an example of blocks selected by a block analysis unit of FIG. 1.
Figure 3:
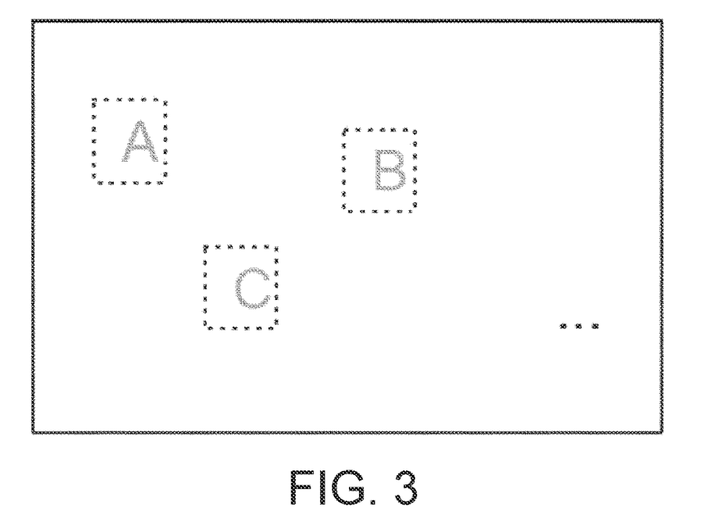
FIG. 3 illustrates an example of a watermark mask frame generated by a watermark mask generation unit of FIG. 1.
Figure 4:
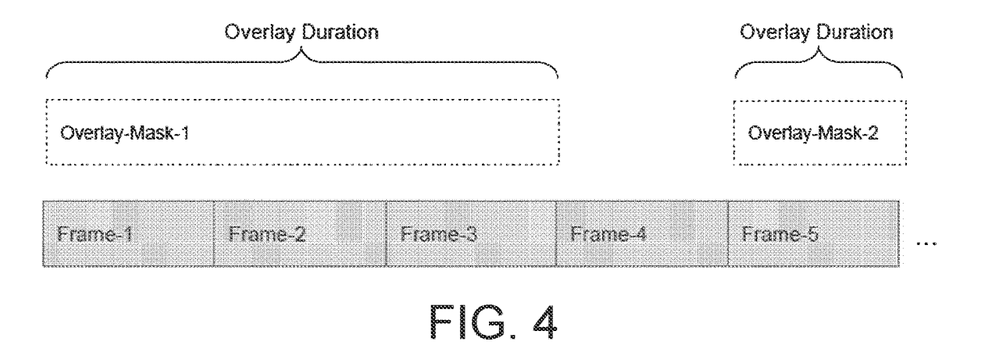
FIG. 4 illustrates an example of overlay duration managed by a synchronization management unit of FIG. 1.
Figure 5:
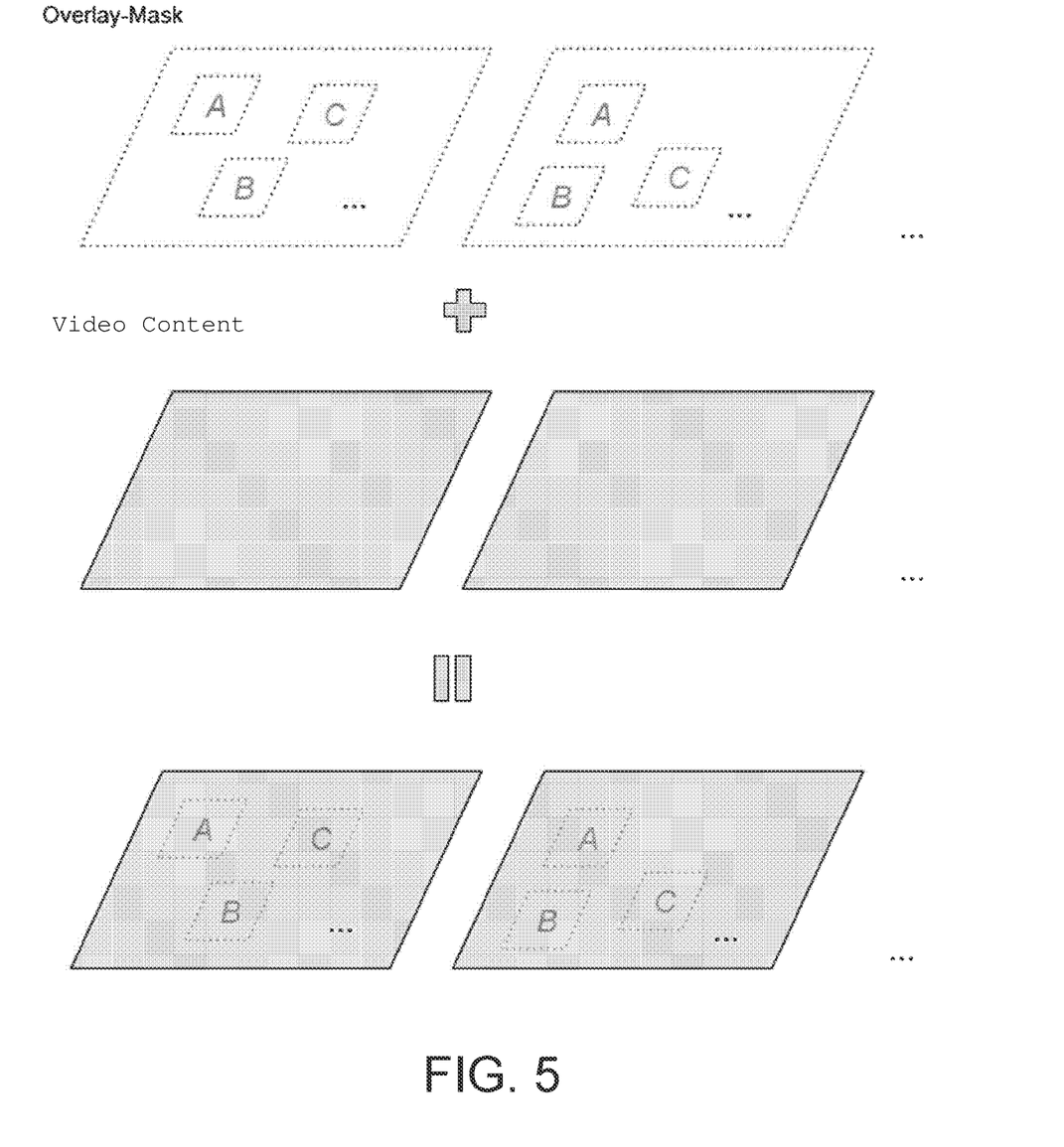
FIG. 5 illustrates an example of an image superimposed by a content overlay unit of FIG. 1.

FIG. 1 is a block diagram illustrating a client forensic watermarking system according to an embodiment of the present disclosure, FIG. 2 illustrates an example of blocks selected by a block analysis unit of FIG. 1, FIG. 3 illustrates an example of a watermark mask frame generated by a watermark mask generation unit of FIG. 1, FIG. 4 illustrates an example of overlay duration managed by a synchronization management unit of FIG. 1, and FIG. 5 illustrates an example of an image superimposed by a content overlay unit.

As illustrated in FIG. 1, the forensic watermarking system includes a content server 110 and a forensic watermarking device 120.

The content server 110 may include a frame extraction unit 112, a block analysis unit 114, a content storage unit 116, and a database storage unit 118.

The frame extraction unit 112 extracts an intra frame from video content. The video content may include a plurality of groups of pictures (GOPs). Here, a GOP includes an intra frame (I frame) that is an intra-frame coded image, a predictive frame (P frame) that is an inter-frame forward predictive coded image, and a bidirectional predictive frame (B frame) that is a bidirectional predictive coded image. For example, one GOP may include I, B, B, P, B, B, P, B, B, P, B, B, P, B, and B. Here, the intra frame is merely used as an example of a frame extracted by the frame extraction unit 114, and it is not intended to exclude a predictive frame (P frame) and a bidirectional predictive frame (B frame).

The block analysis unit 114 may receive the intra frame extracted and outputted by the frame extraction unit 112 as an input, may analyze blocks capable of expressing intact watermark information, and may select a frame in which a watermark mask is displayed in the forensic watermarking device 120. In this case, it is possible to select the frame by analyzing whether there are blocks capable of expressing all payloads in one frame.

The block analysis unit 114 selects a block of a predetermined size or less from the intra frame of an encoded image, that is, the smallest block of the encoded image. The block analysis unit 114 may select, for example, a luminance signal of a 4×4 prediction block from the intra frame. Accordingly, a block encoded to be larger than the predetermined size in the intra frame is excluded from a candidate group of a block in which watermark information is embedded. The reason for excluding the block encoded to be larger than the predetermined size from the candidate group is that an image of this block is nearly a smooth image and thus a watermark is highly likely to be noticed when embedded in this block. Therefore, according to the HEVC standard, when a block is encoded as any one of 32×32, 32×16, 16×32, and 16×16 blocks, the block may be considered as being nearly a smooth image. Further, in the AVC standard, when a block is encoded as any one of 16×16, 8×16, and 16×8 blocks, the block may be considered as being nearly a smooth image.

The block analysis unit 114 selects a macroblock comprised of only blocks of the predetermined size or less. For example, according to the AVC standard, the block analysis unit 114 may select a 16×16 macroblock comprised of only 4×4 subblocks selected from the intra frame of the encoded image.

The block analysis unit 114 identifies whether the number of nonzero quantized coefficients (NNZs) among quantized coefficients of the selected macroblock is greater than a predetermined number Nt. When the number of NNZs is greater than the predetermined number Nt, the block analysis unit 114 selects the blocks as blocks in which the watermark information can be embedded. When the number of NNZs is small, original information of the macroblock is substantially lost in an image decoding process, which may increase synchronization errors. Thus, it is important to set the predetermined number Nt in consideration of this aspect.

When the number of macroblocks capable of embedding the watermark information is a predetermined number, for example, 64, or greater of the number of payloads of the watermark information, the block analysis unit 114 selects the macroblocks as frames in which the watermark information is displayed. An example of blocks according to an analysis result by the block analysis unit 114 is shown in FIG. 2. In FIG. 2, when frames correspond to intra frames respectively, an intra frame Frame-1 of a first GOP and an intra frame Frame-3 of the first GOP are selected as frames in which a watermark mask is displayed in the forensic watermarking device 120.

Temporal flicker may occur in an image on which the watermark mask is superimposed in the forensic watermarking device 120. To prevent or reduce the temporal flicker, the block analysis unit 114 may calculate a pseudo motion vector, thereby determining final macroblocks in which the watermark mask is displayed.

When the final macroblocks in which the watermark mask is displayed are determined, the block analysis unit 114 stores frame information (frame number) and location information (block-location) about the blocks in the frame in the database storage unit 118. The block analysis unit may store luminance information about the final macroblocks in which the watermark mask is displayed.

The content storage unit 116 may store content that is exactly the same as the video content, and depending on an apparatus, may store content in which a sequence header contains information that the watermark mask is later displayed on the frame. However, an image frame itself is not changed, and thus all of the foregoing types of content are collectively used as video content.

The database storage unit 118 stores information about the frame selected by the block analysis unit 114, the location information about the blocks in the frame, and the luminance information as watermark area information. The watermark area information is transmitted to the forensic watermarking device 120 to display forensic watermark information later. When the video content is requested from the forensic watermarking device 120 and a client session ID for specifying the forensic watermarking device 120 or a user is generated at a content playback time, the client session ID is also stored along with client metadata in the database storage unit 118.

The forensic watermarking device 120 may include a downloading unit 122, a watermark mask generation unit 124, a synchronization management unit 126, an overlay unit 128, a display 130, and an attack-defense unit 132.

The downloading unit 122 requests the content that user wants to see from the content server 110, and manages and plays downloaded content. The downloading unit 122 receives not only video content but also a client session ID, watermark area information, and overlay duration from the content server 110.

The watermark mask generation unit 124 receives the client session ID and the watermark area information from the downloading unit 122. The watermark mask generation unit 124 generates a watermark mask using the client session ID and provides the watermark mask to blocks of a mask frame using the watermark area information. Although FIG. 1 shows that the watermark mask is generated in the forensic watermarking device 120, the watermark mask may also be received from the content server 110.

The watermark mask is superimposed on the video content in a semi-transparent form. Therefore, the watermark mask cannot be visually identified. An example of a watermark mask frame generated by the watermark mask generation unit 124 is illustrated in FIG. 3.

As illustrated in FIG. 3, for example, when the client session ID is ABC, the watermark mask may be displayed as ABC in the mask frame. In this case, for invisibility, the watermark may be displayed with alpha indicating a transparency level, in which 0.0 denotes □fully transparent□ and 1.0 denotes □fully opaque□. In this embodiment, as alpha indications, for example, ① Background: Black Alpha 0.0 and Foreground: White Alpha 0.1, ② Background: Black Alpha 0.1 and Foreground: White Alpha 0.0, ③ Background: White Alpha 0.0 and Foreground: Black Alpha 0.1, ④ Background: White Alpha 0.1 and Foreground: Black Alpha 0.0 are used. These alpha values may be selected using the luminance information included in the watermark area information. For example, when the luminance of the content image is low, black alpha is selected for the background and a black alpha value is selected according to a luminance value, and when the luminance of the content image is high, white alpha is selected for the background and a white alpha value is selected according to a luminance value. Here, the alpha values in this embodiment are for illustration and may be changed according to the luminance information.

The synchronization management unit 126 synchronizes a content frame and the mask frame so that the watermark mask is superimposed on the video content at an appropriate time. One watermark mask may be overlapped on one or more frames. An example of overlay duration managed by the synchronization management unit 126 is illustrated in FIG. 4. As illustrated in FIG. 4, watermark mask 1 (overlay-mask-1) may be overlapped on three frames, and watermark 2 (overlay-mask-2) may be overlapped on only one frame.

In FIG. 4, watermark mask 1 (overlay-mask-1) is overlapped on three frames, which may mean, for example, that watermark mask 1 is displayed in two consecutive frames following an I frame in a GOP of a video. In this case, it may mean that there is no temporal change in scenes of the two consecutive frames following the I frame, and this information may be obtained from GOP header information of the content.

The overlay unit 128 superimposes the mask frame on the played content frame. An example of an image superimposed by the content overlay unit 128 is illustrated in FIG. 5. If necessary, the overlay unit 128 may superimpose the mask frame by changing the density of the mask frame in consideration of the color and density of the content frame.

The display 130 displays the video superimposed by the overlay unit 128. In this case, the watermark mask cannot be recognized with the naked eye in the video displayed on the display unit 130.

The attack-defense unit 132 monitors whether there is an external attack of removing the watermark mask. The attack-defense unit 132 monitors whether the watermark area information and the client session ID provided to the overlay unit 128 are valid and monitors whether the synchronization management unit 126 operates based on the watermark area information and overlap duration information. The attack-defense unit 132 also monitors whether the operation of the overlay unit 128 is removed and only the video content is displayed on the display 130. When an external attack is detected during monitoring, playback is stopped so that the video content is not displayed on the display 130.

Figure 6:
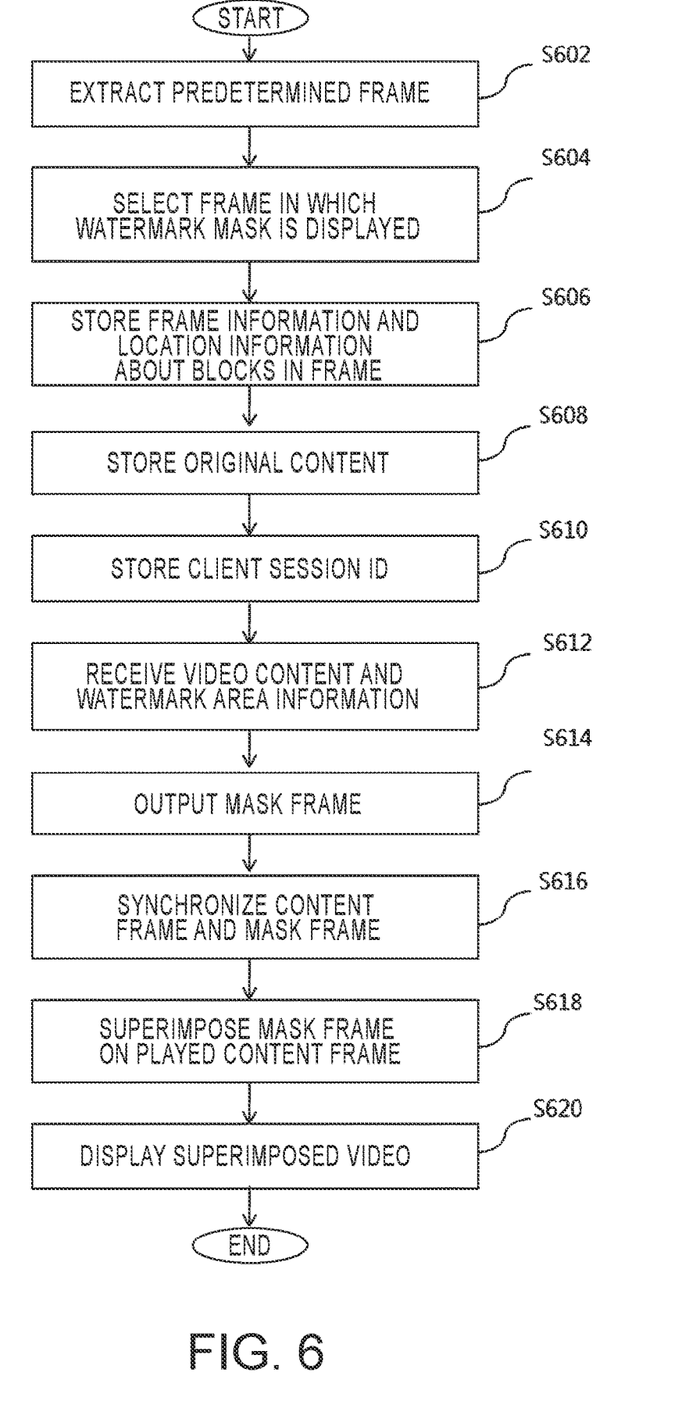
FIG. 6 is a flowchart illustrating a forensic watermarking method according to another embodiment of the present disclosure.

FIG. 6 is a flowchart illustrating a forensic watermarking method according to another embodiment of the present disclosure.

The frame extraction unit 112 extracts a predetermined frame, for example, an intra frame, from video content (S602). The block analysis unit 114 receives the intra frame extracted and outputted by the frame extraction unit 112 as an input, analyzes blocks capable of expressing intact watermark information, and selects a frame in which a watermark mask is displayed in the forensic watermarking device 120 (S604). When macroblocks in which the watermark mask is displayed are determined, the block analysis unit 114 stores frame information (frame number) and location information (block-location) about the blocks in the frame in the database storage unit (S606). The block analysis unit may further store luminance information about the macroblocks in which the watermark mask is displayed.

The content storage unit 116 may store original content, that is, content that is exactly the same as the video content (S608). The content storage unit 116, depending on the content server 110, may store content in which a sequence header contains information that the watermark mask is later displayed on the frame. However, an image frame itself is not changed, and thus all of the foregoing types of content are collectively used as original content.

When the video content is requested from the forensic watermarking device 120 and a client session ID capable of specifying the forensic watermarking device 120 or a user is generated at a content playback time, the client session ID is also stored along with client metadata in the database storage unit 118 (S610).

The downloading unit 122 receives the video content and watermark area information from the content server 110 (S612). The downloading unit 122 may further receive the client session ID and overlay duration in addition to the watermark area information.

The watermark mask generation unit 124 receives the client session ID and the watermark area information from the downloading unit 122. The watermark mask generation unit 124 generates a watermark mask using the client session ID and provides the watermark mask to blocks of a mask frame using the watermark area information, thereby outputting the mask frame (S614).

The synchronization management unit 126 synchronizes a content frame and the mask frame so that the watermark mask is superimposed on the video content at an appropriate time (S616). One watermark mask may overlap on one or more frames.

The overlay unit 128 superimposes the mask frame on the played content frame (S618). An example of an image superimposed by the content overlay unit 128 is illustrated in FIG. 5. If necessary, the overlay unit 128 may superimpose the mask frame by changing the density of the mask frame in consideration of the color and density of the content frame.

The display 130 displays the video superimposed by the overlay unit 128 (S620). In this case, the watermark mask cannot be recognized with the naked eye in the video displayed on the display unit 130.

Although an example in which blocks are analyzed and selected has been described in the embodiments of the present disclosure, fixed blocks may be selected and used in some cases.

The embodiments of the present disclosure described above are provided merely to explain the technical idea of the present disclosure, and the scope of the present disclosure should be construed as being defined by the appended claims. Further, it will be apparent to those having ordinary skill in the art to which this disclosure belongs that various modifications and variations can be made in the disclosure without departing from the essential characteristics of the disclosure, and thus any technical ideas within the appended claims and equivalents thereof should be construed as being included in the scope of the disclosure.

What is claimed is:

1. A forensic watermarking device capable of communicating with a content server comprising a second processor configured to select a watermark mask area in which a watermark mask is displayed from video content and store watermark area information about the watermark mask area in a memory, the forensic watermarking device comprising a first processor configured to:
   request the video content to be played from the content server;
   receive the video content and the watermark area information from the content server;
   output the watermark mask using the received watermark area information; and
   superimpose the outputted watermark mask on the watermark mask area of the received video content,
   wherein the receiving further includes receiving a client session ID from the content server,
   the outputting further includes generating and outputting the watermark mask using the received client session ID,
   the outputting further includes generating a mask frame comprising the watermark mask,
   the superimposing further includes superimposing the generated mask frame on an image frame comprising the watermark mask area, of the received video content, and
   the mask frame is divided into a background and a foreground, and different alpha values representing a transparency level are imparted to the background and the foreground for invisibility.

2. The forensic watermarking device of claim 1, wherein the outputting further includes extracting a luminance value from the watermark area information, and selecting a darkness alpha value for the background when the luminance value is a darkness value based on a predetermined threshold value.

3. The forensic watermarking device of claim 1, wherein the first processor is further configured to synchronize the mask frame with the image frame so that the mask frame is superimposed on the image frame comprising the watermark mask area, of the video content.

4. The forensic watermarking device of claim 3, wherein, when overlay duration indicating that there is no change in an image frame following the image frame comprising the watermark mask area is received, the synchronizing further includes synchronizing the mask frame with the image frame so that the mask frame is superimposed on the image frame for the overlay duration.

5. The forensic watermarking device of claim 4, wherein the first processor is further configured to monitor, with respect to the watermark mask, whether the client session ID received from the content server is valid, whether the synchronizing includes operating based on the overlay duration, or whether an operation of the superimposing is removed and only the video content is displayed.

6. A forensic watermarking system comprising:
   a content server comprising a second processor configured to select a watermark mask area in which a watermark mask is displayed from video content and storing watermark area information about the watermark mask area; and
   the forensic watermarking device according to claim 1,
   wherein, when client metadata is received along with a request for the video content to be played from the forensic watermarking device, the second processor is configured to generate the client session ID capable of specifying a client of the video content and store the client session ID along with the client metadata in a memory.

7. The forensic watermarking system of claim 6, wherein the second processor is configured to analyze blocks of a predetermined frame of GOP content of the video content and store in the memory location information about blocks in which the watermark mask is displayed as the watermark area information.

8. A forensic watermarking method performed by a forensic watermarking device capable of communicating with a content server comprising a second processor configured to select a watermark mask area in which a watermark mask is displayed from video content and store watermark area information about the watermark mask area in a memory, the forensic watermarking method comprising:
   a step of requesting the video content to be played from the content server and receiving the video content and the watermark area information from the content server;

a step of outputting the watermark mask using the watermark area information received in the receiving step; and a step of superimposing the watermark mask outputted in the outputting step on the watermark mask area of the video content received in the receiving step, wherein the receiving step comprises further receiving a client session ID from the content server, the outputting step further comprises generating and outputting the watermark mask using the client session ID received in the receiving step, the generating step further comprises generating a mask frame comprising the watermark mask, by synchronizing the mask frame with an image frame comprising the watermark mask area, of the video content, the superimposing step further comprises superimposing the mask frame generated in the generating step on the image frame, and the mask frame is divided into a background and a foreground, and different alpha values representing a transparency level are imparted to the background and the foreground for invisibility.

9. The forensic watermarking method of claim 8, further comprising a step of monitoring, with respect to the watermark mask, whether the client session ID received from the content server is valid or whether an operation of the superimposing step is removed and only the video content is displayed.

* * * * *